United States Patent
Chen et al.

(10) Patent No.: US 11,692,874 B2
(45) Date of Patent: Jul. 4, 2023

(54) PEAK ALIGNMENT FOR THE WAVELENGTH CALIBRATION OF A SPECTROMETER

(71) Applicant: Tokyo Electron Limited, Tokyo (JP)

(72) Inventors: Yan Chen, Fremont, CA (US); Xinkang Tian, Fremont, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 17/335,814

(22) Filed: Jun. 1, 2021

(65) Prior Publication Data

US 2022/0381612 A1    Dec. 1, 2022

(51) Int. Cl.
  *G01J 3/02*     (2006.01)
  *G01J 3/18*     (2006.01)
  *G01J 3/28*     (2006.01)

(52) U.S. Cl.
  CPC .......... *G01J 3/0297* (2013.01); *G01J 3/0208* (2013.01); *G01J 3/18* (2013.01); *G01J 3/2803* (2013.01)

(58) Field of Classification Search
  CPC .......... G01J 3/0297; G01J 3/0208; G01J 3/18; G01J 3/2803; G01J 3/28; G01J 3/36
  See application file for complete search history.

(56) References Cited

U.S. PATENT DOCUMENTS 6,700,661 B1 * 3/2004 Cadell ................... G01J 3/28
                                                    250/252.1
7,583,378 B2 * 9/2009 Rezac .................. G01N 21/274
                                                    356/326

OTHER PUBLICATIONS

Martinsen, P. et al., "Accurate and Precise Wavelength Calibration for Wide Bandwidth Array Spectrometers," Appl. Spectrosc. 62, 1008-1012 (2008) (Year: 2008).*
Du, X., et al. "Accurate wavelength calibration method for flat-field grating spectrometers." Applied Spectroscopy 65.9 (2011): 1083-1086 (Year: 2011).*

* cited by examiner

*Primary Examiner* — Tarifur R Chowdhury
*Assistant Examiner* — Roberto Fabian, Jr.
(74) *Attorney, Agent, or Firm* — Oblon, McClelland, Maier & Neustadt, L.L.P.

(57) ABSTRACT

Aspects of the present disclosure provide a method for wavelength calibration of a spectrometer. The method can include receiving a calibration light signal having first spectral components of different first wavelengths; separating and projecting the first spectral components onto pixels of a detector of the spectrometer; establishing a relation between the first wavelengths and pixel numbers of first pixels on which the first spectral components are projected; calculating first residual errors between the first wavelengths and estimated wavelengths that are associated by the relation to the pixel numbers of the first pixels; receiving an optical signal having a second spectral component of a second wavelength; projecting the optical signal onto a second pixel; and calibrating the second wavelength based on a second residual error calculated based on one of the first residual errors that corresponds to a pair of the first pixels between which the second pixel is located.

11 Claims, 8 Drawing Sheets

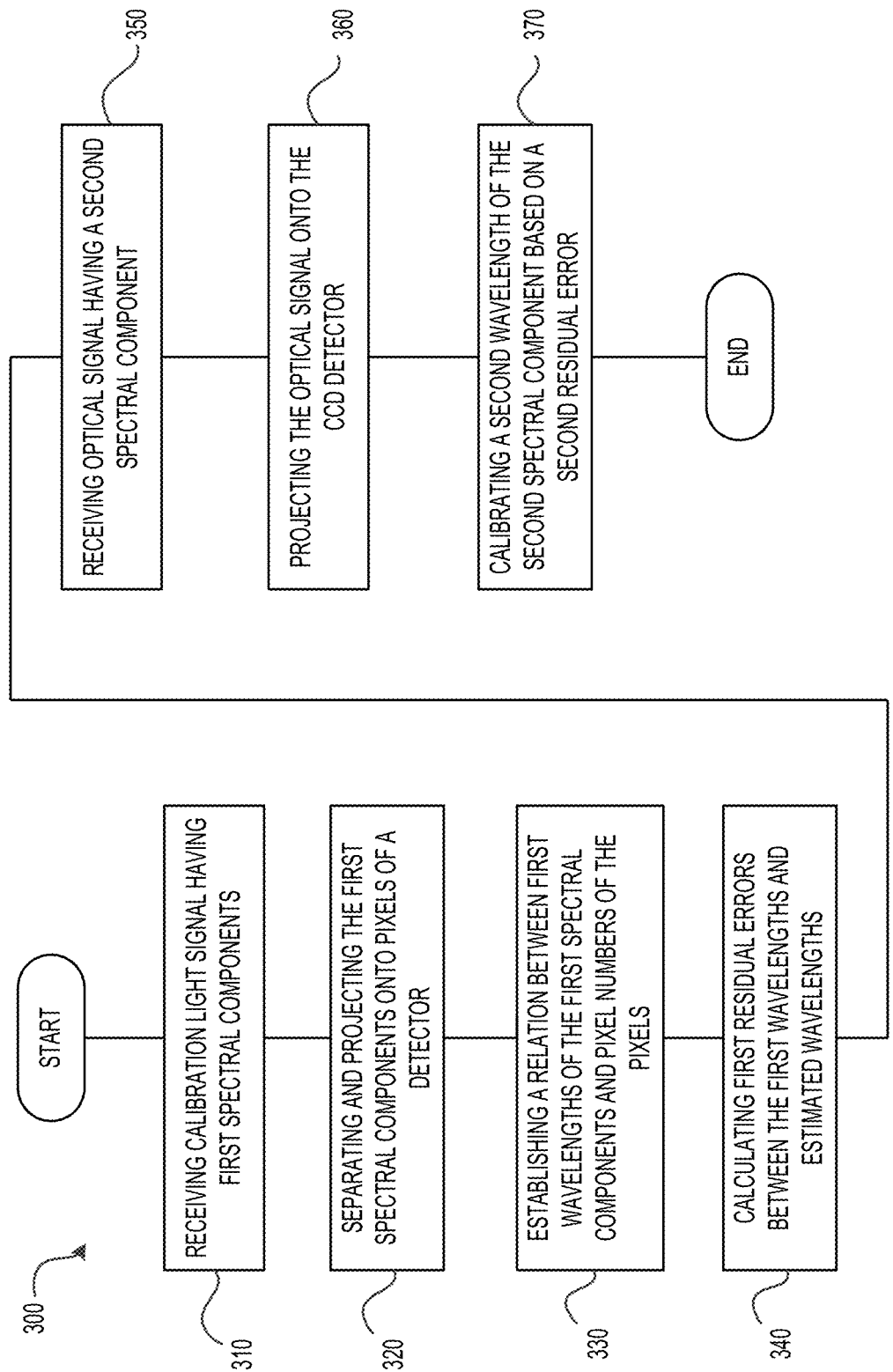

PEAK ALIGNMENT FOR THE WAVELENGTH CALIBRATION OF A SPECTROMETER

FIELD OF THE INVENTION

The present disclosure relates to spectrometers, and, more particularly, to wavelength calibration of a spectrometer.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Spectrometers are finding increased application in many optical measurements. In order to validate the spectrum measured with any spectrometer, it is necessary to perform a wavelength calibration.

SUMMARY

Aspects of the present disclosure provide a method for wavelength calibration of a spectrometer. For example, the method can include receiving a calibration light signal having a plurality of first spectral components of different first wavelengths, and separating and projecting the first spectral components onto a plurality of pixels of a detector of the spectrometer. The method can also include establishing a relation between the first wavelengths of the first spectral components and pixel numbers of first ones of the pixels on which the first spectral components are projected, and calculating first residual errors between the first wavelengths and estimated wavelengths that are associated by the relation to the pixel numbers of the first pixels, respectively. The method can also include calibrating a second wavelength of a second spectral component of an optical signal based on a second residual error. In an embodiment, the second residual error can be calculated based on at least one of the first residual errors.

For example, establishing a relation can include constructing a curve that fits the first wavelengths of the first spectral components and the pixel numbers of the first pixels. As another example, the method can further include receiving the optical signal having at least the second spectral component of the second wavelength, and projecting the optical signal onto at least a second one of the pixels of the detector, wherein the second pixel is located between at least one pair of the first pixels, and the at least one of the first residual errors corresponds to the first pixel pair. In an embodiment, the second pixel can be between two of the first pixels, and the second residual error is calculated by interpolation of the first residual errors that correspond to the two first pixels. In another embodiment, the pixel number of the second pixel can be smaller or larger than the pixel number of any one of the first pixels, and the second residual error can be equal to one of the first residual errors that corresponds to one of the first pixels that has a smallest or largest pixel number. In yet another embodiment, the pixel number of the second pixel can be smaller or larger than the pixel number of any one of the first pixels, and the second residual error can be calculated by extrapolation of at least two of the first residual errors.

In an embodiment, the curve can be constructed subject to no constraints. In another embodiment, the curve can be constructed subject to at least one of the first wavelengths and the pixel number of one of the first pixels that corresponds to the first wavelength. For example, the pixel number of the second pixel can be a smallest or largest one of the pixel numbers of the first pixels. As another example, the pixel number of the second pixel can include smallest and/or largest two of the pixel numbers of the first pixels.

For example, the curve can be constructed by a least square fit method, a polynomial regression, an interpolation method, a principal component analytical method, a point-wise cross-correlation method, a least absolute deviation regression method or a wavelet transform method.

In an embodiment, the pixels of the detector can be arranged linearly. In another embodiment, the pixels of the detector can be arranged in an array.

For example, calculating first residual errors can include subtracting the estimated wavelengths from the first wavelengths, and calibrating the second wavelength can include subtracting the second residual error from the second wavelength.

Aspects of the present disclosure also provide a system for wavelength calibration of a spectrometer. The system can include a controller. For example, the controller can be configured to receive a calibration light signal having a plurality of first spectral components of different first wavelengths, and separate and project the first spectral components onto a plurality of pixels of a detector of the spectrometer. The controller can also be configured to establish a relation between the first wavelengths of the first spectral components and pixel numbers of first ones of the pixels on which the first spectral components are projected, and calculate first residual errors between the first wavelengths and estimated wavelengths that are associated by the relation to the pixel numbers of the first pixels, respectively. The controller can also be configured to calibrate a second wavelength of a second spectral component of an optical signal based on a second residual error. In an embodiment, the second residual error can be calculated based on at least one of the first residual errors. For example, the controller can calculate the first residual errors by subtracting the estimated wavelengths from the first wavelengths, and the second wavelength is calibrated by subtracting the second residual error from the second wavelength.

For example, the controller can establish a relation by constructing a curve that fits the first wavelengths of the first spectral components and the pixel numbers of the first pixels. In an embodiment, the controller can further be configured to receive the optical signal and project the optical signal onto at least a second one of the pixels of the detector, wherein the second pixel can be between two of the first pixels, and the second residual error can be calculated by interpolation of the first residual errors that correspond to the two first pixels. In another embodiment, the controller can further be configured to receive the optical signal and project the optical signal onto at least a second one of the pixels of the detector, wherein a pixel number of the second pixel can be smaller or larger than the pixel number of any one of the first pixels, and the second residual error can be equal to one of the first residual errors that corresponds to one of the first pixels that has a smallest or largest pixel number. In yet another embodiment, the controller can further be configured to receive the optical signal and project the optical signal onto at least a second one of the pixels of the detector, wherein a pixel number of the second pixel can be smaller or larger than the pixel number of any one of the first pixels, and the second residual error can be calculated by extrapolation of at least two of the first residual errors.

Aspects of the present disclosure further provide a non-transitory computer-readable storage medium. For example, the non-transitory computer-readable storage medium can have stored therein instructions that, when executed by a controller, cause the controller to establish a relation between different first wavelengths of a plurality of first spectral components of a calibration light signal and pixel numbers of first ones of a plurality of pixels of a detector of a spectrometer on which the first spectral components are projected, calculate first residual errors between the first wavelengths and estimated wavelengths that are associated by the relation to the pixel numbers of the first pixels, respectively, and calibrate, based on a second residual error, a second wavelength of a second spectral component of an optical signal that is projected onto at least a second one of the pixels of the detector, wherein the second pixel can be located between at least one pair of the first pixels, and the second residual error is calculated based on one of the first residual errors that corresponds to the first pixel pair. In an embodiment, the first residual errors can be calculated by subtracting the estimated wavelengths from the first wavelengths, and the second wavelength can be calibrated by subtracting the second residual error from the second wavelength.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein:

FIG. 3 is a flow chart illustrating an exemplary method for wavelength calibration of a spectrometer according to some embodiments of the disclosure;

DETAILED DESCRIPTION

Figure 1:
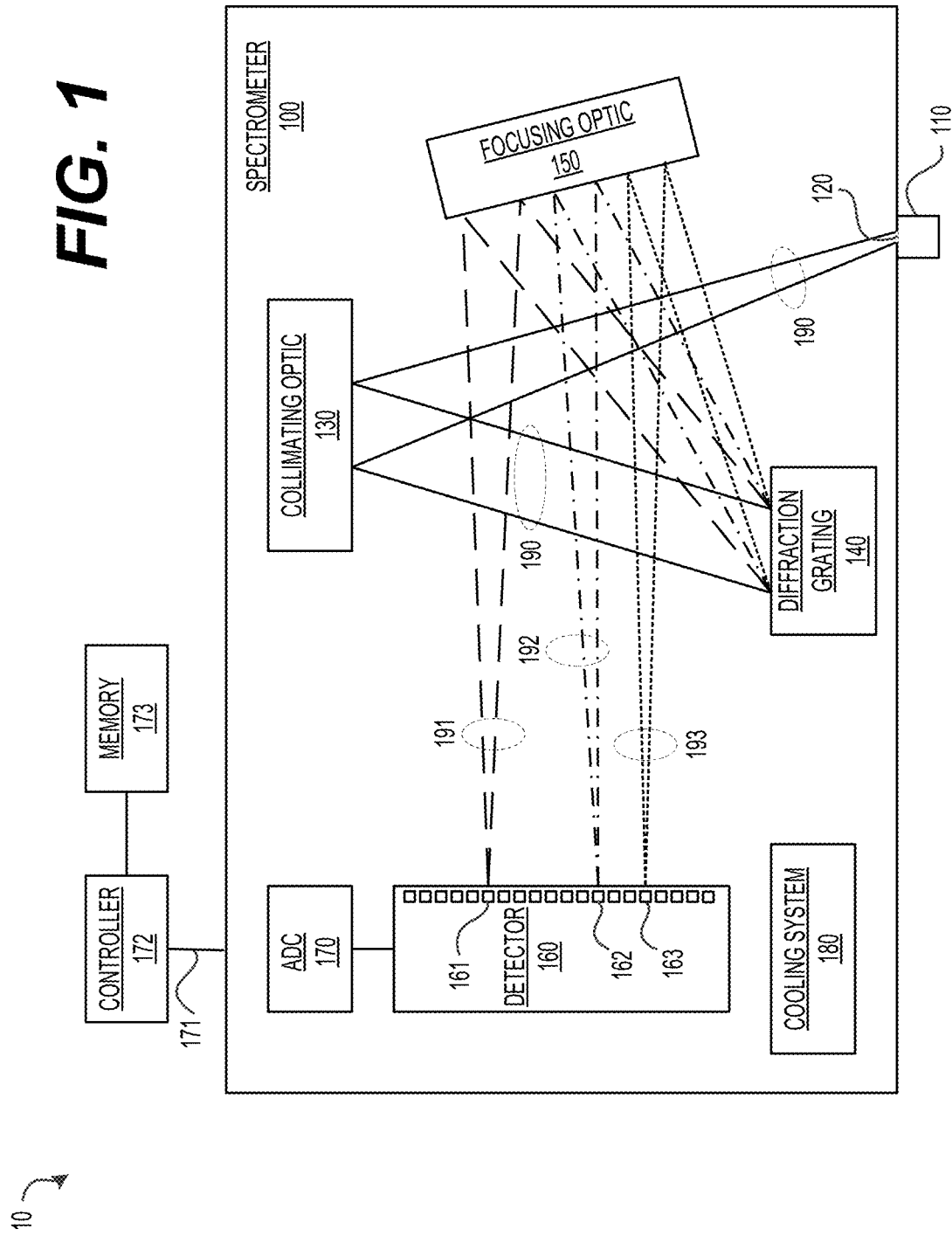
FIG. 1 is a functional block diagram illustrating an exemplary system for wavelength calibration of a spectrometer according to some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

A spectrometer can be used to determine spectral characteristics about an object and/or element through analysis of its interactions with light or of the spectral components (or spectral lines) of the light itself. A spectrometer can separate and measure the distinct spectral components of light. There are two kinds of spectrometers according to different light-collecting techniques. One is a scanning spectrometer, which can collect light exiting from an exit slit by using a single-channel detector, such as photomultiplier tube (PMT) detector and silicon detector, that is positioned behind the exit slit. The scanning spectrometer may include a diffraction grating, which is driven by a stepper motor to rotate in steps of predetermined degrees (scanning step number) such that light of a specific wavelength can reach the exit slit and be detected by the PMT detector. In another embodiment, a scanning spectrometer can comprise a hyperspectral imaging system, where wavelength scanning is accomplished by scanning the passband of an optical filter placed in front on an imaging device. For example, the hyperspectral imaging system can include collecting optics, a wavelength tunable filter (i.e., the optical filter), and an array detector (i.e., the imaging system). The collecting optics can collect an optical signal, the wavelength tunable filter can tune the wavelengths of the collected optical signal such that the tuned optical signal can have certain scanning step passband wavelength numbers, and the tuned optical signal can be projected onto the array detector. An exemplary hyperspectral imaging system is described in US 2020/0372629 A1 and US 2020/0373210 A1, which are incorporated therein for reference in their entirety. The other kind of spectrometers is a charge coupled device (CCD) spectrometer, which can collect light from a fixed diffraction grating by using a multi-channel CCD, or other type of detector, e.g. a CMOS detector, photodiode array, etc. Accordingly, the CCD spectrometer can collect the whole spectrum of the light simultaneously.

FIG. 1 is a functional block diagram illustrating an exemplary system 10 for wavelength calibration of a spectrometer 100 according to some embodiments of the disclosure. A connector 110 can secure an input fiber (not shown) to the spectrometer 100. For example, the connector 110 can be a subminiature version A (SMA) connector. As another example, the input fiber can be an UV/DUV single core fiber cable. The input fiber can couple the light 190 generated from a light source (not shown) to the spectrometer 100. For example, the light source can be an Hg—Ar, Neon or He lamp. In an embodiment, the light 190 generated by the Hg—Ar lamp can include a plurality of spectral components (or spectral lines) of different wavelengths. For example, the light 190 can include first to third spectral components 191 to 193, which have wavelengths of 404.656 nm, 696.543 nm and 763.511 nm, respectively.

A slit 120 can be mounted behind the connector 110. The slit 120 can control the amount of the light 190 (i.e., photon flux) that enters the spectrometer 100 and limit the spatial distribution of the light 190. The slit 120 typically is rectangular and on the order of the wavelength of the light to be measured, e.g., the light 190. For example, the slit 120 can be sized from 5 µm to 800 µm in width and 1 mm to 2 mm in height. The light 190 generated by the Hg—Ar lamp can be defined with a Lorentzian function. After passing through the slit 120, the light 190 will be redefined with a Voigt function that is the convolution of the Lorentzian function and an instrumental broadening function, which is attributable to the non-negligible width of the slit 120 and is typically a Gaussian function. The width of the slit 120 can thus affect the spectral resolution (or the spectral bandpass (BP) of the spectrometer 100; the narrower the slit 120, the higher the spectral resolution. However, the slit 120 that is narrow can decrease the strength and signal-to-noise ratio (SNR) of the light 190 that enters the spectrometer 100. In an embodiment, the SNR of the light 190 can be increased by averaging multiple measurements or by a moving average method.

A collimating optic 130 can ensure that the light 190 from the slit 120 travels toward a diffraction grating 140 in a parallel, collimated fashion because the diffraction grating 140 can only work correctly if it is illuminated with collimated light. For example, the collimating optic 130 can be a lens, which can be disposed along an optical path from the slit 120 to the diffraction grating 140. As another example, the collimating optic 130 can be a mirror (e.g., an off-line spherical mirror), which can be disposed beside the slit 120 and the diffraction grating 140, as shown in FIG. 1, and be disposed such that the slit 120 is located at its focal point.

The diffraction grating 140 can diffract (or separate) the collimated light 190 from the collimating optic 130 into the first to third spectral components 191 to 193 and direct the separated first to third spectral components 191 to 193 onto a focusing optic 150 at different positions. The first to third spectral components 191 to 193, which have different wavelengths, can leave the diffraction grating 140 at different angles, but a bundle of light of each of the first to third spectral components 191 to 193 can leave the diffraction grating 140 at the same angle. The groove density (or groove frequency) of the diffraction grating 140, i.e., the amount of grooves per mm, can determine the ability (i.e., the spectral BP and spectral resolution) of the spectrometer 100 to discriminate between adjacent spectral components, e.g., the first to third spectral components 191 to 193. The groove facet angle (or blaze angle) of the diffraction grating 140 can determine the overall shapes of the first to third spectral components 191 to 193. In an embodiment, the diffraction grating 140 can be blazed to provide high diffraction efficiency at a specific wavelength, i.e., a blaze wavelength ($\lambda_B$). The diffraction efficiency will decrease by 50% at $0.6 \times \lambda_B$ and $1.8 \times \lambda_B$. The SNR of the spectrometer 100 can be improved by biasing the blaze wavelength of the diffraction grating 140 toward the weak side of the spectral range.

In an embodiment, the diffraction grating 140 can be transmissive, like a multi-slit aperture, and be disposed along an optical path from the collimating optic 130 to the focusing optic 150. In another embodiment, the diffraction grafting 140 can be reflective, with its grooved surface (representing the multi-slit aperture) coated with a highly reflective material, such as aluminum, and be disposed beside the collimating optic 130 and the focusing optic 150, as shown in FIG. 1.

In an embodiment, the diffraction grating 140 can be a ruled grating, which is formed by etching a plurality of parallel, angled grooves onto the surface of a substrate and coating the grooves with a highly reflective material. In another embodiment, the diffraction grating 140 can be a holographic grating, which is formed by interfering two UV beams in a fringe field having a standing-wave pattern exposed to a polished substrate coated with photoresist, and thus has sinusoidal cross-sectional grooves. As compared with the ruled grating, the holographic grating can exhibit much less stray light, but is more difficult to be blazed due to its sinusoidal groove profile.

The focusing optic 150 can focus the separated first to third spectral components 191 to 193 onto a detector 160 at different positions based on their different wavelengths. For example, the focusing optic 150 can focus the first to third spectral components 191 to 193 onto first to third pixels 161 to 163 of the detector 160, respectively, and the pixel numbers (or pixel positions in nm) of the first to third pixels 161 to 163 can be associated with the wavelengths of the first to third spectral components 191 to 193. In an embodiment, the focusing optic 150 can be a lens, which can be disposed along an optical path from the diffraction grating 140 to the detector 160. In another embodiment, the focusing optic 150 can be a mirror, which can disposed beside the diffraction grating 140 and the detector 160, as shown in FIG. 1.

The detector 160 can be, for example, a CCD, a CMOS sensor, a photodiode array detector, or any other type of array detector. The detector 160 can be arranged on a focal plane of the focusing optic 150, and collect the first to third spectral components 191 to 193 from the focusing optic 150. For example, the detector 160 can include a plurality of array-based or linearly arranged pixels, e.g., the first to third pixels 161 to 163, which can respond to and interact with the first to third spectral components 191 to 193 that strike them, respectively, and build up their respective charges; the brighter the spectral component (or the higher the intensity of the spectral component) and/or the longer the interaction, the more charge is built. In an embodiment, the detector 160 can include 1,024 linearly arranged pixels. In another embodiment, the detector 160 can include 2,048 linearly arranged pixels. The detector 160 can then output analog signals according to the built charges of the pixels. The analog signals output by the detector 160 may be too high to be directly coupled to an analog-to-digital converter (ADC) 170. In such a scenario, the analog signals have to be linearly inverted, amplified and shifted before passing to the ADC 170. The ADC 170 can convert the processed analog signals into digital signals and transmit the digital signals to a controller 172 (or a processor) for further processing. The controller 172 can be coupled to a non-transitory computer-readable storage medium 173. For example, the non-transitory computer-readable storage medium 173 can have stored therein instructions, programs and algorithms that, when executed by the controller 172, can cause the controller 172 to perform some associated operations. In an embodiment, the controller 172 and the non-transitory computer-readable storage medium 173 can be installed in an external computer, and the computer can be coupled to the spectrometer 100 via an interface 171. For example, the interface 171 can be a universal serial bus (USB).

Optionally, the spectrometer 100 can be equipped with a cooling system 180 if it is to be in measurement of the light 190 with long integration time. For example, the cooling system 180 can be a thermoelectric cooler (TEC). Even when no protons are impinging on the detector 160 and thus no electrons will be excited and no current will be generated accordingly, there are still some electrons that will be excited spontaneously due to their thermal energy, thus generating a dark current. The dark current can accumulate over the integration time, and can affect the measurement of the detector 160 significantly if the integration time is over, for example, 100 ms. Because the dark current comes from thermal fluctuations, lowering the operating temperature of the detector 160 can be a way to decrease the dark current. In an embodiment, the cooling system 180 can be arranged close to the detector 160 to reduce the dark current, thereby reducing the corresponding dark noises and enhancing the dynamic range of the spectrometer 100.

Before the spectrometer 100 is put into service, it is necessary to conduct wavelength calibration against a known standard to guarantee accuracy and validate measurement. The wavelength calibration can be done by comparing experimentally determined wavelengths to literature wavelengths from the standard. For example, the wavelength calibration can be conducted on the spectrometer 100 by determining the location of the characteristic peak of each of the first to third spectral components 191 to 193 on the detector 160. In an embodiment, an exemplary wavelength calibration can be conducted as follows.

A light source, e.g., an Hg—Ar lamp, can be connected to the connector 110 of the spectrometer 100 via an UV/DUV fiber cable. The Hg—Ar lamp can generate the light 190, and the UV/DUV fiber cable can couple the light 190 to the spectrometer 100. The light 190 can pass through the slit 120 and travel to the collimating optic 130. The collimating optic 130 can guide and align the light 190 in a direction to the diffraction grating 140 to form parallel, collimated light 190. The diffraction grating 140 can diffract (or separate) the parallel, collimated light 190 into distinct spectral components of different wavelengths, e.g., the first to third spectral components 191 to 193, and the diffracted first to third spectral components 191 to 193 can leave the diffraction grating 140 at different angles and travel onto the focusing optic 150 at different positions. The focusing optic 150 can focus the first to third spectral components 191 to 193 onto the detector 160 at different pixels associated with the different wavelengths of the first to third spectral components 191 to 193. For example, the focusing optic 150 can focus the first to third spectral components 191 to 193 onto the first to third pixels 161 to 163 of the detector 160, respectively, and the first to third pixels 161 to 163 can thus be impinged by the characteristic peaks of the wavelengths of the first to third spectral components 191 to 193, respectively. During the operation of the detector 160, the cooling system 180 can be activated to keep the operating temperature of the detector 160 at a specific low level. The ADC 170 can convert the analog signals of the pixels of the detector 160, including the first to third pixels 161 to 163, into digital signals and transmit the digital signals to the controller 172. A Voigt function can be used to fit the digital signals of the pixels of the detector 160.

Figures 2A, 2B:
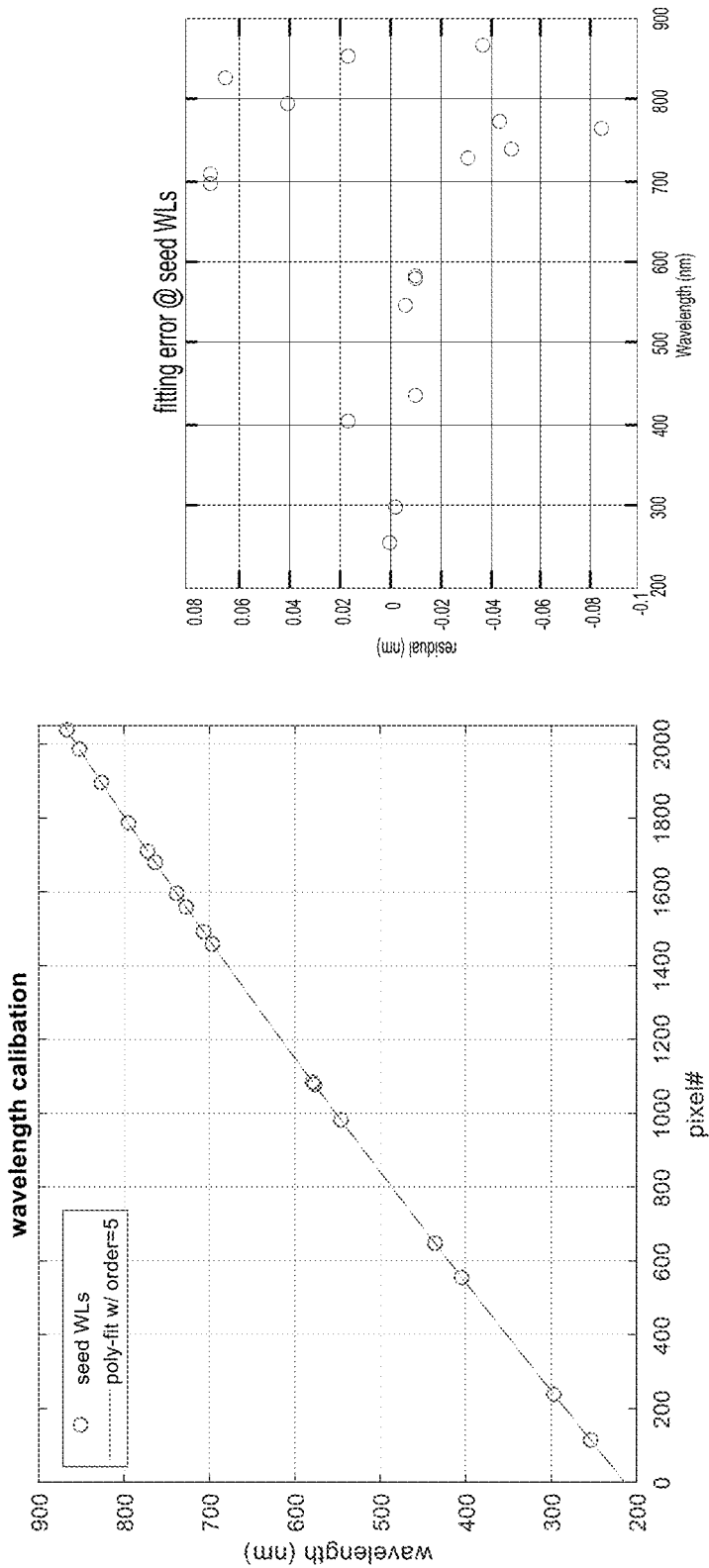
FIG. 2a shows a relation of wavelengths of a plurality of spectral components of light and pixel numbers of a plurality of pixels of a detector on which the peaks of the spectral components of the light are projected according to some embodiments of the disclosure.
FIG. 2b shows residual errors between the wavelengths and estimated wavelengths obtained by substituting the pixel numbers into a $5^{th}$-order polynomial that fits the wavelengths and the pixel numbers according to some embodiments of the disclosure.

FIG. 2a shows a relation of the wavelengths (i.e., seed wavelengths, in nm) of the spectral components of the light 190 (on the x-axis) and the pixel numbers of the pixels of the detector 160 (on the y-axis) on which the peaks of the spectral components of the light 190 are projected according to some embodiments of the disclosure. In FIG. 2a, the points can represent wavelength-pixel number pairs, and be fitted by a curve. For example, the curve can be defined by a polynomial, e.g., a 5th-order polynomial, with the pixel numbers as an independent variable and the wavelengths as a dependent variable. FIG. 2b shows residual errors between the wavelengths and estimated wavelengths obtained by substituting the pixel numbers into the 5th-order polynomial. In an embodiment, the residual errors can be used to calibrate the wavelengths of light measured by the spectrometer 100.

FIG. 3 is a flow chart illustrating an exemplary method 300 for wavelength calibration of a spectrometer according to some embodiments of the disclosure. In an embodiment, some of the steps of the method 300 shown can be performed concurrently or in a different order than shown, can be substituted by other method steps, or can be omitted. Additional method steps can also be performed as desired. Aspects of the method 300 can be implemented by a spectrometer and a controller (or a processor), such as the spectrometer 100 and the controller 172 illustrated in and described with respect to the preceding figures.

At step 310, the spectrometer 100 can receive a calibration light signal that has seed wavelengths. For example, the Hg—Ar lamp can generate the calibration light signal, e.g., the light 190, the UV/DUV fiber cable can couple the calibration light signal to the connector 110, and the calibration light signal can enter the spectrometer 100 through the slit 120. In an embodiment, the calibration light signal can have a plurality of first spectral components (or spectral lines) of different wavelengths. For example, the calibration light signal can have the first to third spectral components 191 to 193, which have wavelengths of 404.656 nm, 696.543 nm and 763.511 nm, respectively.

At step 320, the diffraction grating 140 of the spectrometer 100 can diffract (or separate) the first spectral components of the calibration light signal, and the focusing optic 150 can focus and project the separated first spectral components of the calibration light signal onto the detector 160 of the spectrometer 100 at different positions. For example, the diffraction grating 140 can separate the first to third spectral components 191 to 193, and the focusing optic 150 can focus and project the separated first to third spectral components 191 to 193 onto the first to third pixels 161 to 163 of the detector 160, respectively. The detector 160 can then output analog signals according to charges built on the pixels, and the ADC 170 can convert the analog signals into digital signals and transmit the digital signals to the controller 172 (optionally, via the interface 171).

At step 330, a relation can be established between the first wavelengths of the first spectral components and pixel numbers of first ones of the pixels (which are referred to as "first pixels" hereinafter) on which the first spectral components are projected. For example, the controller 172 of the controller 172 can execute instructions, software and/or algorithm stored in the non-transitory computer-readable storage medium 173 to establish the relation between the wavelengths of the first to third spectral components 191 to 193 of the light 190 and the pixel numbers (or pixel positions in nm) of the first to third pixels 161 to 163 of the detector 160. In an embodiment, the topmost one of the pixels of the detector 160 can have a pixel number of 0, and the first pixel 161 can be the $n^{th}$ pixel from the top and have a pixel number of n−1.

At step 340, first residual errors between the first wavelengths and estimated wavelengths can be calculated. In an embodiment, the estimated wavelengths can be associated by the relation to the pixel numbers of the first pixels. For example, the first residual errors can be calculated by subtracting the estimated wavelengths from the first wavelengths. In an embodiment, the first residual errors can be used to calibrate wavelengths of light, e.g., optical signal, to be measured by the spectrometer 100.

At step 350, the spectrometer 100 can receive the optical signal. For example, the optical signal can have at least a second spectral component of a second wavelength.

At step 360, the optical signal can be projected onto the detector 160. For example, the second spectral component of the optical signal can be projected onto at least a second one of the pixels (which is referred to as "second pixel" hereinafter) of the detector 160.

At step 370, the second wavelength can be calibrated based on a second residual error. For example, the second wavelength can be calibrated by subtracting the second residual error from the second wavelength. In an embodiment, the second pixel can be located between at least one pair of the first pixels, e.g., the first pixel 161, and the second residual error can be calculated based on one of the first residual errors that corresponds to the first pixel pair, e.g., a first residual error that corresponds to the first pixel 161.

In an embodiment, the relation between the first wavelengths of the first spectral components of the calibration light signal (e.g., the first to third spectral components 191 to 193) and the pixel numbers of the first pixels (e.g., the first to third pixels 161 to 163) of the detector 160 on which the first spectral components are projected can be established by constructing a curve that fits the first wavelengths of the first spectral components and the pixel numbers of the first pixels. For example, the curve can be constructed by a least square fit method, a polynomial regression, an interpolation method, a principal component analytical method, a pointwise cross-correlation method, a least absolute deviation regression method or a wavelet transform method. In an embodiment, a $5^{th}$-order polynomial curve can be used to fit the first wavelengths and the corresponding pixel numbers, as shown in FIG. 2a, and the first residual errors can be calculated by subtracting from the first wavelengths the estimated wavelengths that can be obtained by substituting the pixel numbers of the first pixels into the 5th-order polynomial, as shown in FIG. 2b.

Figure 4:
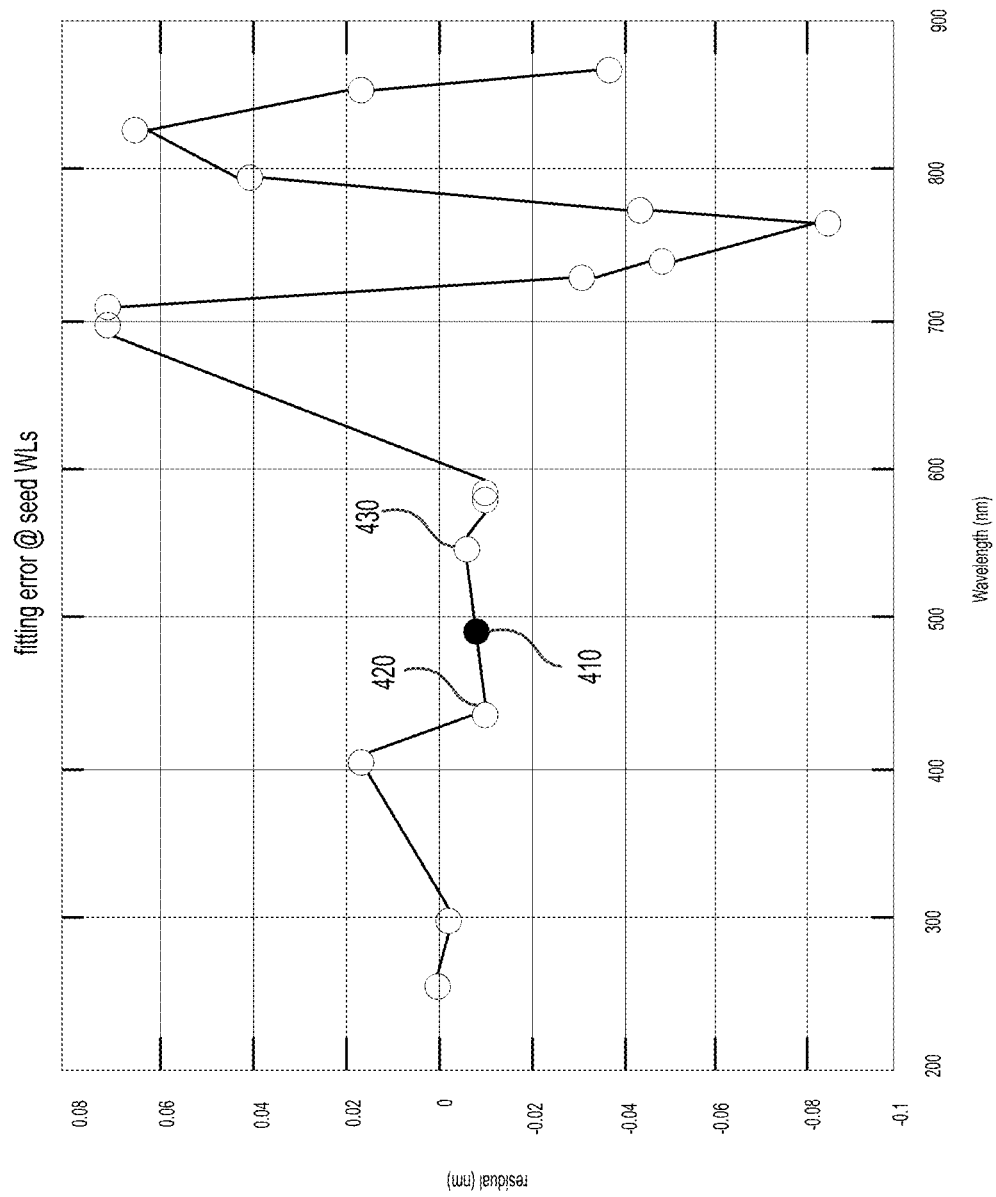
FIG. 4 shows exemplary linear interpolation of two neighboring first residual errors to obtain a second residual error that corresponds to a pixel having a pixel number between two pixel numbers of two pixels that correspond to the two neighboring first residual errors according to some embodiments of the disclosure.

In an embodiment, the second pixel, on which the second spectral component of the an optical signal is projected, can be between two of the first pixels, and the second residual error can be calculated by interpolation of the first residual errors that correspond to the two first pixels. For example, the second residual 410 that corresponds to the second pixel can be calculated by linear interpolation of the first residual errors 420 and 430 that correspond to the two first pixels, respectively, as shown in FIG. 4

Figure 5:
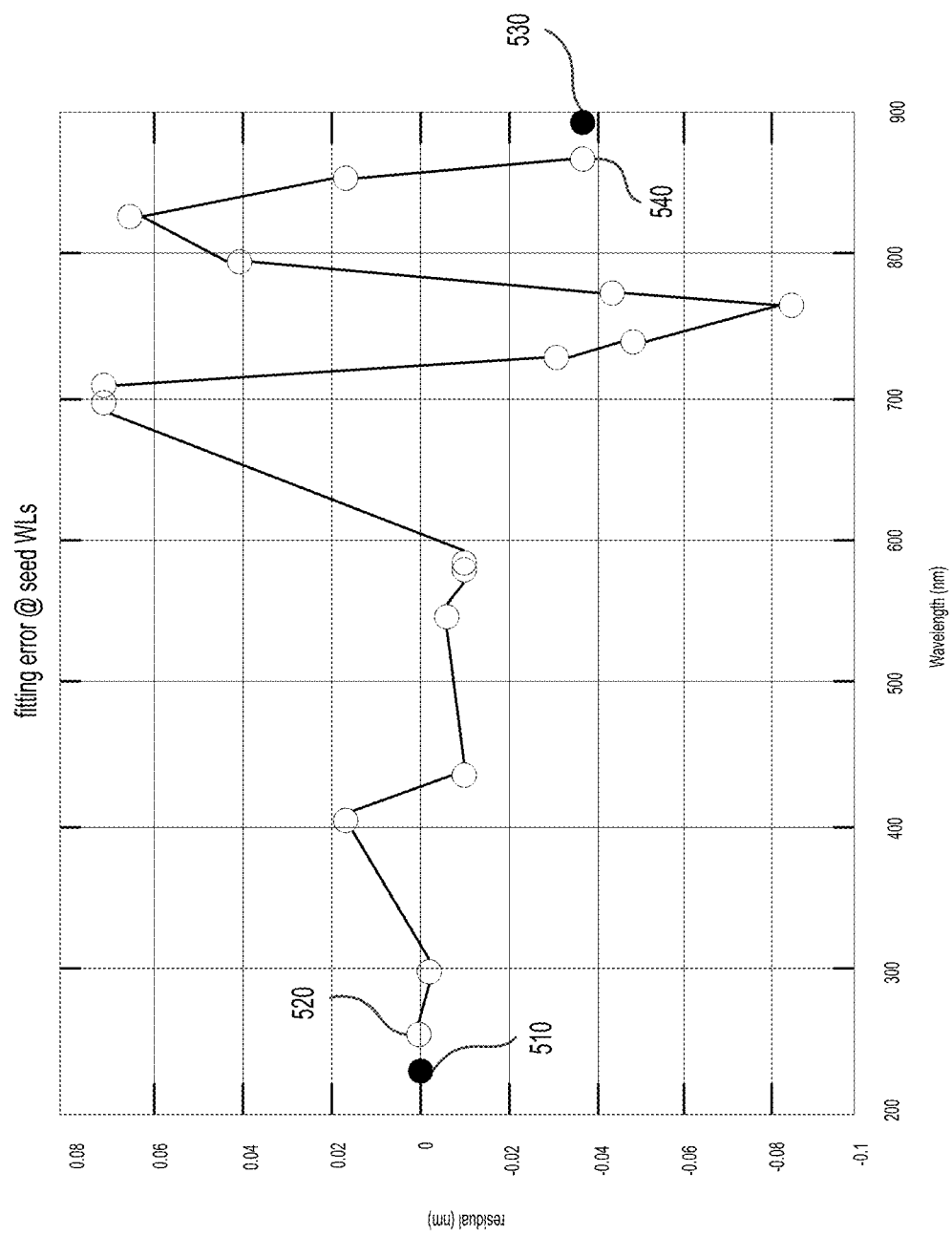
FIG. 5 shows exemplary extrapolation of at least two of the first residual errors to obtain a second residual error of a second wavelength that is not within the first wavelengths range of the first spectral components according to some embodiments of the disclosure.

In another embodiment, the pixel number of the second pixel can be smaller or larger than the pixel number of any one of the first pixels, which indicates that the second wavelength is not within the first wavelengths range of the first spectral components of the calibration light signal (e.g., the seed wavelengths range). In such a scenario, as shown in FIG. 5, the second residual errors 510 and 530 corresponding to the second wavelengths can be, for example, equal to the first residual errors 520 and 540 corresponding to the smallest and largest first wavelengths, respectively. As another example, each of the second residual errors 510 and 530 can be calculated by extrapolation of at least two of the first residual errors.

Figure 6:
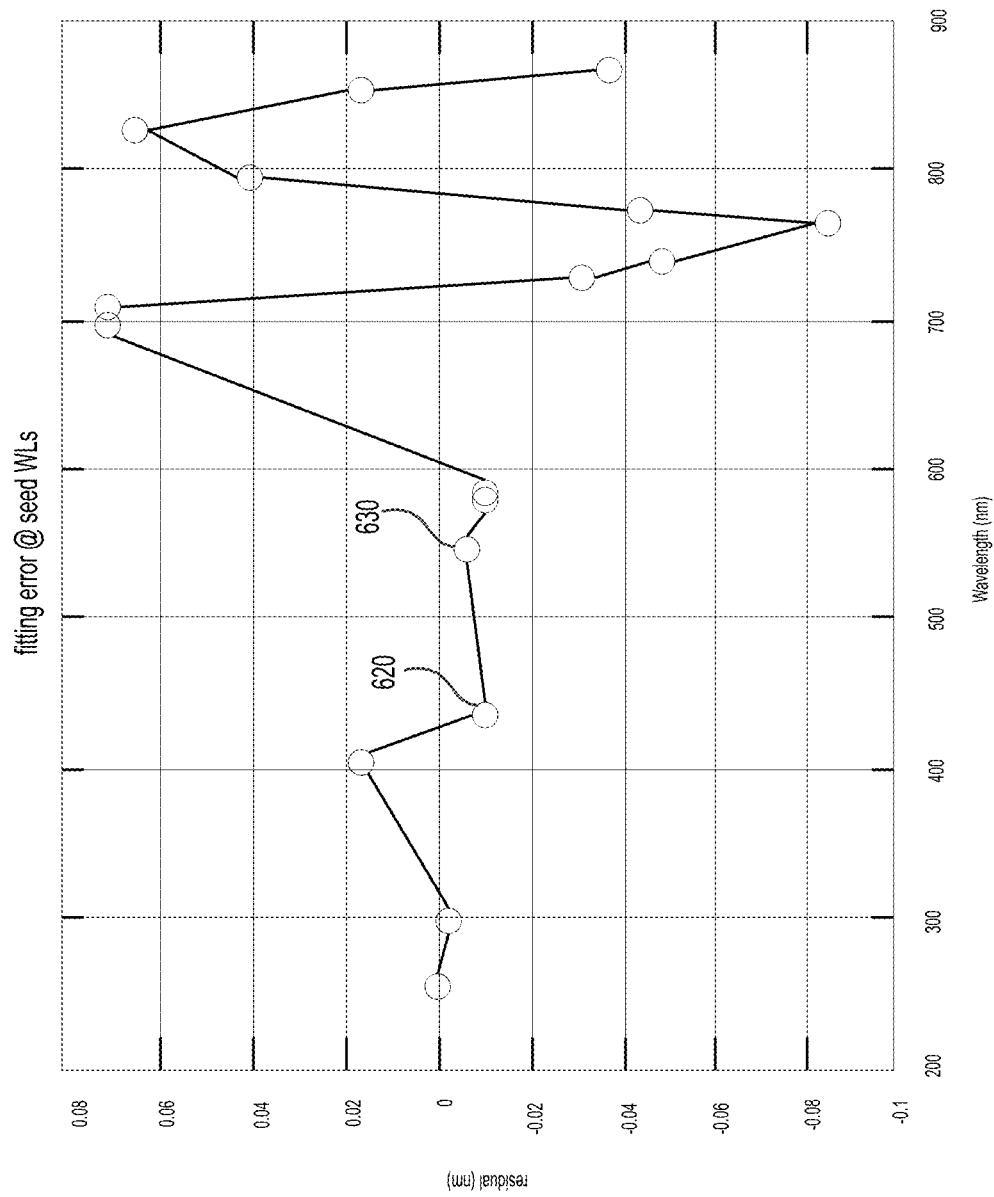
FIG. 6 plots the first residual errors corresponding to the first wavelengths when a fitting curve passes the smallest wavelength-pixel number pair according to some embodiments of the disclosure.

In an embodiment, the curve, e.g., the 5th-order polynomial curve shown in FIG. 2a, can be constructed subject to no constraints. Accordingly, the curve may pass none of the wavelength-pixel number pairs and have a smaller total error (e.g., a least square mean error calculated by a least square fit method, for example) as compared with a curve subject to at least one constraint, and the first residual errors thus calculated are plotted as shown in FIG. 2b. In another embodiment, the curve can be constructed subject to at least one of the first wavelengths and the pixel number of one of the first pixels that corresponds to the first wavelength. Accordingly, the curve may pass at least one of the wavelength-pixel number pairs. For example, the curve can pass one of the wavelength-pixel number pairs that corresponds to the smallest one of the pixel numbers of the first pixels, and the first residual errors thus calculated are plotted as shown in FIG. 6. In FIG. 6, first residual errors 620 and 630 correspond to the first residual errors 420 and 430 shown in FIG. 4, respectively.

Figure 7:
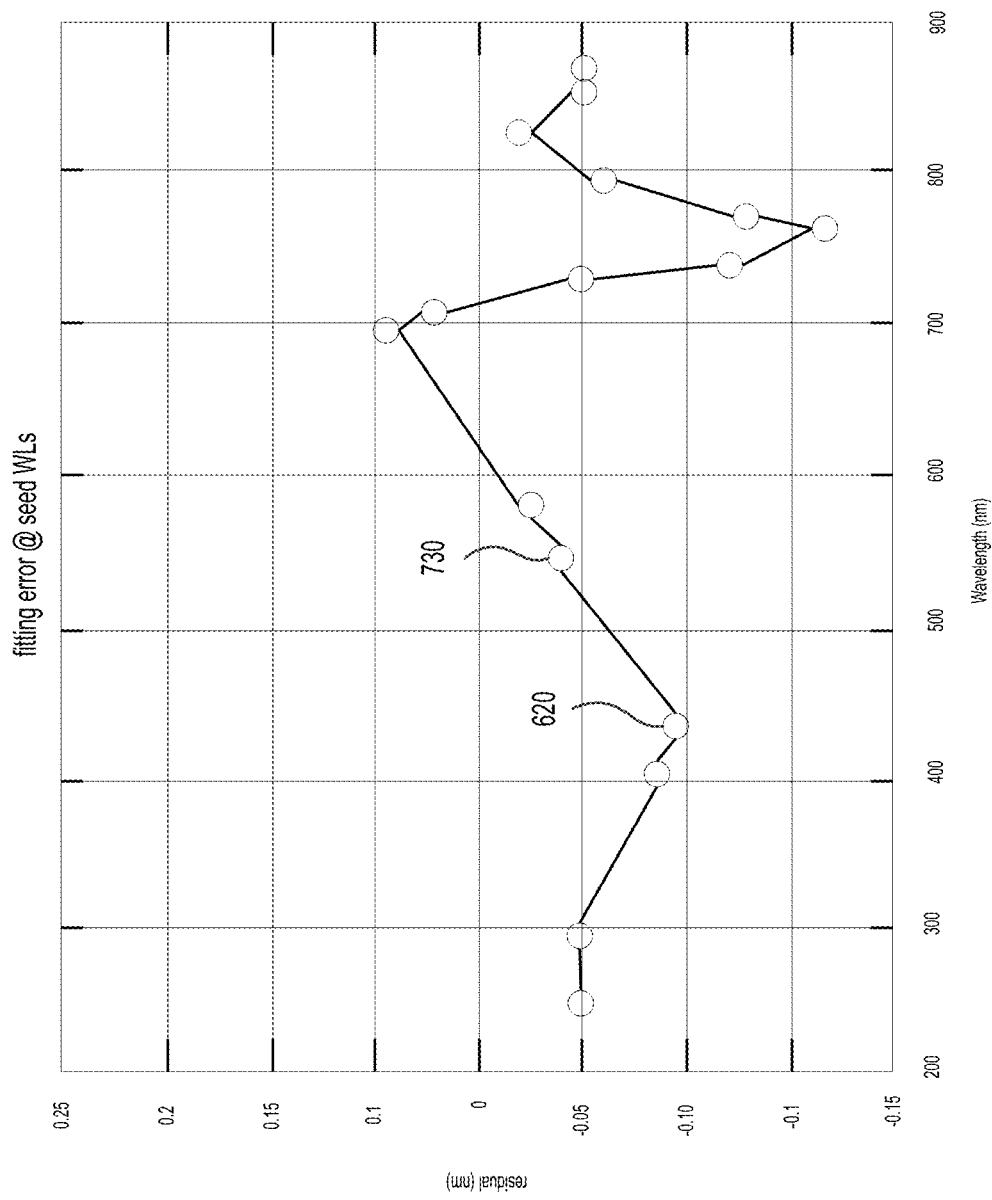
FIG. 7 plots the first residual errors corresponding to the first wavelengths when a fitting curve passes the smallest two and largest two wavelength-pixel number pairs according to some embodiments of the disclosure.

In another embodiment, the curve can pass at least two of the wavelength-pixel number pairs. For example, the wavelength-pixel number pairs can correspond to only the smallest two, only the largest two, or the smallest two and the largest two of the pixel numbers of the first pixels. In an embodiment, the curve can pass four of the wavelength-pixel number pairs that correspond to the smallest two and the largest two of the pixel numbers of the first pixels, and the first residual errors thus calculated are plotted as shown in FIG. 7. In FIG. 7, first residual errors 720 and 730 correspond to the first residual errors 420 and 430 shown in FIG. 4, respectively.

Figure 8A:
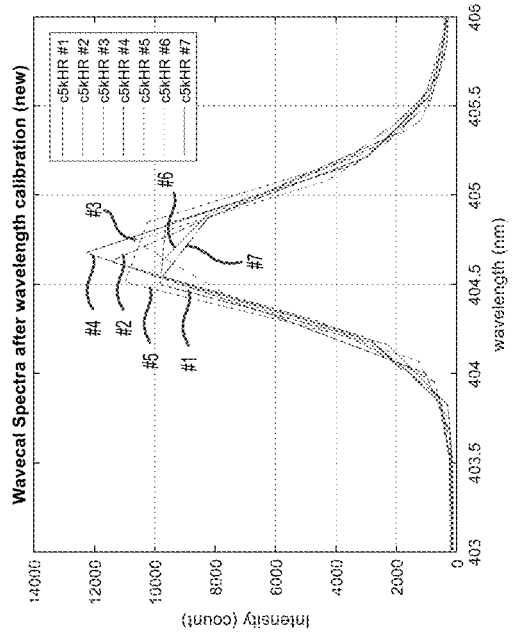
FIG. 8a plots first spectral components as a function of their intensities, which have the same wavelength, measured by a plurality of spectrometers and calibrated by a method different from the exemplary method according to some embodiments of the disclosure.
Figure 8B:
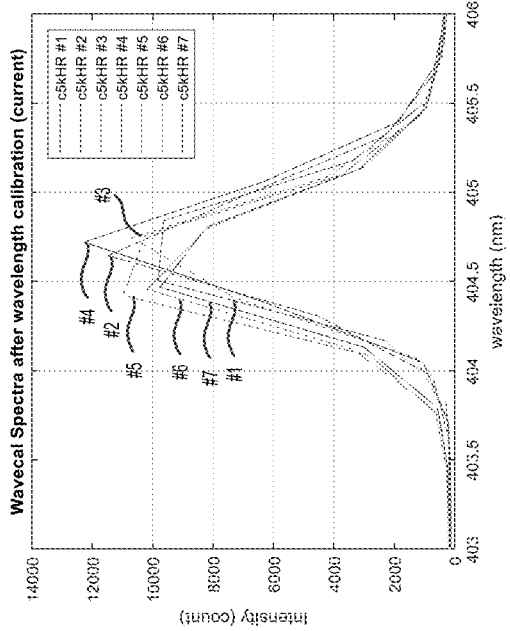
FIG. 8b plots the first components as a function of their intensities, which are measured by the spectrometers but calibrated by the exemplary method according to some embodiments of the disclosure.
Figure 8C:
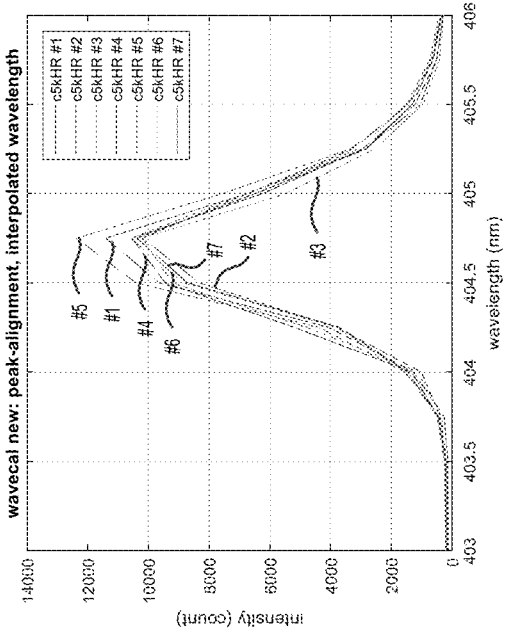
FIG. 8c plots the first components as a function of their intensities, with their peaks aligned with one another according to some embodiments of the disclosure.

In an embodiment, the exemplary method 300 can also be used for wavelength calibration of a plurality of spectrometers. FIG. 8a plots the first spectral components 191 as a function of their intensities, which have a wavelength of 404.656 nm, measured by first to seventh spectrometers #1 to #7 and calibrated by a method different from the exemplary method 300. FIG. 8b plots the first spectral components 191 as a function of their intensities, which are measured by the first to seventh spectrometers #1 to #7 but calibrated by the exemplary method 300. FIG. 8c plots the first spectral components 191 as a function of their intensities, with their peaks aligned with one another by, for example, an interpolation method.

In an embodiment, the non-transitory computer-readable storage medium 173 can have stored therein instructions, programs and algorithms that, when executed by the controller 172, can cause the controller 172 to perform some operations associated with the exemplary method 300. For example, the instructions stored in the non-transitory computer-readable storage medium 173, when executed by the controller 172, can cause the controller 172 to establish a relation between different first wavelengths of a plurality of first spectral components of calibration light signal and pixel numbers of first ones of a plurality of pixels of a detector of a spectrometer on which the first spectral components are projected, calculate first residual errors between the first wavelengths and estimated wavelengths that are associated by the relation to the pixel numbers of the first pixels, respectively, and calibrate, based on a second residual error, a second wavelength of a second spectral component of an optical signal that is projected onto at least a second one of the pixels of the detector, wherein the second pixel can be located between at least one pair of the first pixels, and the second residual error is calculated based on one of the first residual errors that corresponds to the first pixel pair. As another example, the first residual errors can be calculated by subtracting the estimated wavelengths from the first wavelengths, and the second wavelength can be calibrated by subtracting the second residual error from the second wavelength.

In another embodiment, the controller 172 can be configured to perform some operations associated with the exemplary method 300. For example, the controller 172 can be configured to establish a relation between different first wavelengths of a plurality of first spectral components of a calibration light signal and pixel numbers of first ones of a plurality of pixels of a detector of a spectrometer on which the first spectral components are projected, to calculate first residual errors between the first wavelengths and estimated wavelengths that are associated by the relation to the pixel numbers of the first pixels, respectively, and to calibrate, based on a second residual error, a second wavelength of a second spectral component of an optical signal that is projected onto at least a second one of the pixels of the detector, wherein the second pixel can be located between at least one pair of the first pixels, and the second residual error is calculated based on one of the first residual errors that corresponds to the first pixel. In an embodiment, the second circuitry can calculate the first residual errors by subtracting the estimated wavelengths from the first wavelengths, and the third circuitry can calibrate the second wavelength by subtracting the second residual error from the second wavelength. In another embodiment, the controller 172 can also be configured to receive the calibration light signal having the first spectral components of the different first wavelengths, separate and project the first spectral components onto a plurality of pixels of a detector of the spectrometer, receive an optical signal having at least a second spectral component of a second wavelength, and project the optical signal onto at least a second one of the pixels of the detector.

In an embodiment, the exemplary method 300 can also be applied to a scanning spectrometer, and the pixel numbers used in the establishment of the relation between wavelengths and pixel numbers for the spectrometer 100 can be replaced with scanning step numbers of a diffraction grating of the scanning spectrometer.

In another embodiment, the exemplary method 300 can also be applied to a hyperspectral imaging system, where pixel numbers used in the establishment of the relation between wavelengths and pixel numbers for the spectrometer 100 can be replaced with the scanning step passband wavelength numbers of an optical filter placed in front of an imaging device, to allow only a selected wavelength to reach the imaging device.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "target substrate" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a dielectric layer on or overlying a base substrate structure such as a thin film. Thus, substrate is not limited to any particular base structure, underlying dielectric layer or overlying dielectric layer, patterned or un-patterned, but rather, is contemplated to include any such dielectric layer or base structure, and any combination of dielectric layers and/or base structures. The description may reference particular types of substrates, but this is for illustrative purposes only.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A method for wavelength calibration of a spectrometer, comprising:

receiving a calibration light signal having a plurality of first spectral components of different first wavelengths;

separating and projecting the first spectral components onto a plurality of pixels of a detector of the spectrometer simultaneously;

establishing a relation between the first wavelengths of the first spectral components and pixel numbers of first ones of the pixels on which the first spectral components are projected by constructing a curve that fits the first wavelengths of the first spectral components and the pixel numbers of the first pixels;

calculating first residual errors between the first wavelengths and estimated wavelengths that are associated by the relation to the pixel numbers of the first pixels, respectively;

calibrating a second wavelength of a second spectral component of an optical signal based on a second residual error;

receiving the optical signal; and projecting the optical signal onto at least a second one of the pixels of the detector, wherein the second residual error is calculated based on at least one of the first residual errors, and the second residual error is equal to one of the first residual errors that corresponds to one of the first pixels that has a smallest pixel number when a pixel number of the second pixel is smaller than the smallest pixel number, and is equal to another one of the first residual errors that corresponds to one of the first pixels that has a largest pixel number when the pixel number of the second pixel is larger than the largest pixel number.

2. The method of claim 1, wherein the curve is constructed subject to no constraints.

3. The method of claim 1, wherein the curve is constructed subject to at least one of the first wavelengths and the pixel number of one of the first pixels that corresponds to the first wavelength.

4. The method of claim 3, wherein the pixel number of the second pixel is a smallest or largest one of the pixel numbers of the first pixels.

5. The method of claim 3, wherein the curve is constructed subject to smallest two and largest two of the first wavelengths and the pixel numbers of four of the first pixel that correspond to the smallest two and largest two first wavelengths.

6. The method of claim 1, wherein the curve is constructed by a least square fit method, a polynomial regression, an interpolation method, a principal component analytical method, a point-wise cross-correlation method, a least absolute deviation regression method or a wavelet transform method.

7. The method of claim 1, wherein calculating first residual errors includes subtracting the estimated wavelengths from the first wavelengths, and calibrating the second wavelength includes subtracting the second residual error from the second wavelength.

8. A system for wavelength calibration of a spectrometer, comprising:

a controller configured to:

receive a calibration light signal having a plurality of first spectral components of different first wavelengths;

separate and project the first spectral components onto a plurality of pixels of a detector of the spectrometer simultaneously;

establish a relation between the first wavelengths of the first spectral components and pixel numbers of first ones of the pixels on which the first spectral components are projected by constructing a curve that fits the first wavelengths of the first spectral components and the pixel numbers of the first pixels;

calculate first residual errors between the first wavelengths and estimated wavelengths that are associated by the relation to the pixel numbers of the first pixels, respectively;

calibrate a second wavelength of a second spectral component of an optical signal based on a second residual error;

receive the optical signal; and project the optical signal onto at least a second one of the pixels of the detector, wherein the second residual error is calculated based on at least one of the first residual errors, and the second residual error is equal to one of the first residual errors that corresponds to one of the first pixels that has a smallest pixel number when a pixel number of the second pixel is smaller than the smallest pixel number, and is equal to another one of the first residual errors that corresponds to one of the first pixels that has a largest pixel number when the pixel number of the second pixel is larger than the largest pixel number.

9. The system of claim 8, wherein the controller calculates the first residual errors by subtracting the estimated wavelengths from the first wavelengths, and the second wavelength is calibrated by subtracting the second residual error from the second wavelength.

10. A non-transitory computer-readable storage medium having stored therein instructions that, when executed by a controller, cause the controller to:

establish a relation between different first wavelengths of a plurality of first spectral components of a calibration light signal and pixel numbers of first ones of a plurality of pixels of a detector of a spectrometer on which the first spectral components are projected simultaneously by constructing a curve that fits the first wavelengths of the first spectral components and the pixel numbers of the first pixels;

calculate first residual errors between the first wavelengths and estimated wavelengths that are associated by the relation to the pixel numbers of the first pixels, respectively;

calibrate, based on a second residual error, a second wavelength of a second spectral component of an optical signal that is projected onto at least a second one of the pixels of the detector;

receive the optical signal; and project the optical signal onto at least a second one of the pixels of the detector, wherein the second residual error is calculated based on at least one of the first residual errors, and the second residual error is equal to one of the first residual errors that corresponds to one of the first pixels that has a smallest pixel number when a pixel number of the second pixel is smaller than the smallest pixel number, and is equal to another one of the first residual errors that corresponds to one of the first pixels that has a largest pixel number when the pixel number of the second pixel is larger than the largest pixel number.

11. The non-transitory computer-readable storage medium of claim 10, wherein the first residual errors are calculated by subtracting the estimated wavelengths from the first wavelengths, and the second wavelength is calibrated by subtracting the second residual error from the second wavelength.

\* \* \* \* \*